Figure 1:
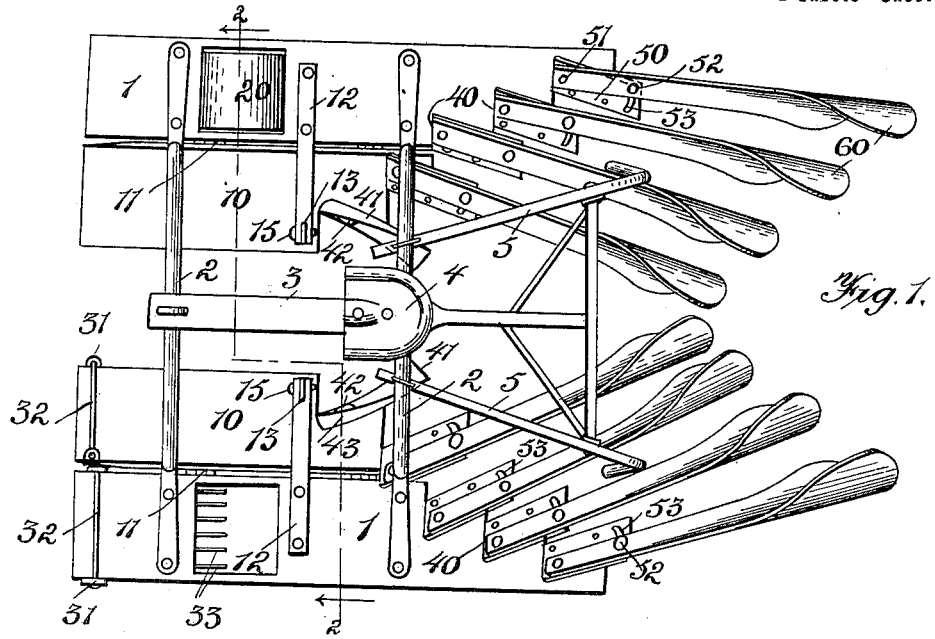

No. 657,840. Patented Sept. 11, 1900.
S. SMITH.
LISTED CORN CULTIVATOR.
(Application filed Jan. 20, 1900.)
(No Model.) 2 Sheets—Sheet 1.

Witnesses: Geo. E. Frech, R. P. Herrick.

Inventor: Seth Smith, by Collamer & Co., Attorneys.

No. 657,840. Patented Sept. 11, 1900.
S. SMITH.
LISTED CORN CULTIVATOR.
(Application filed Jan. 20, 1900.)
(No Model.) 2 Sheets—Sheet 2.
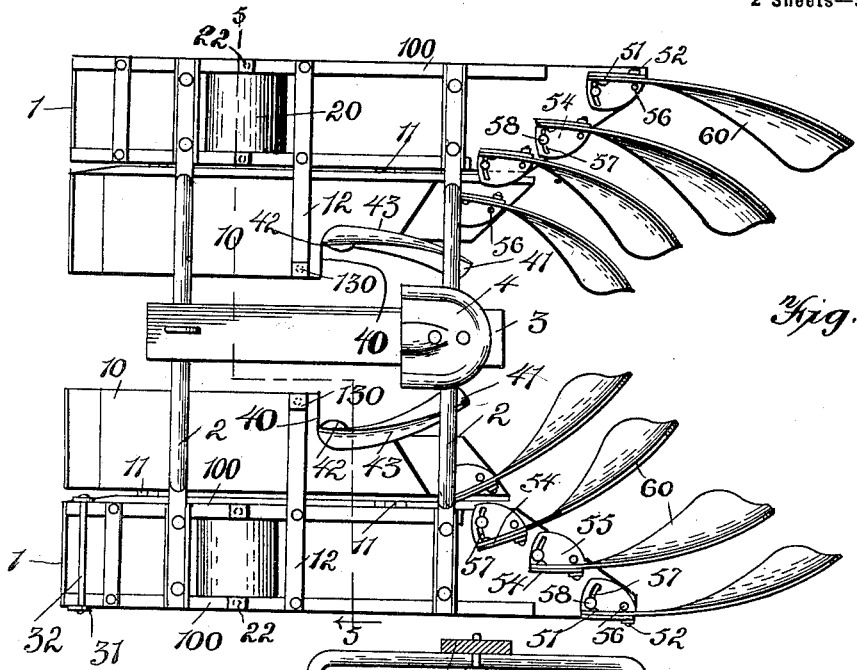
Fig. 4.
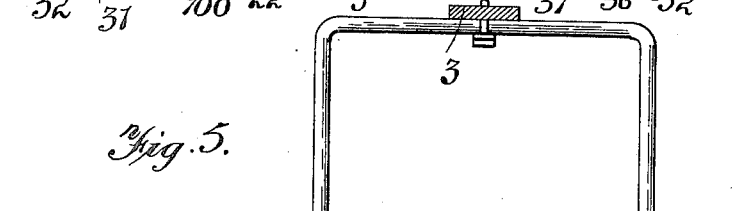
Fig. 5.
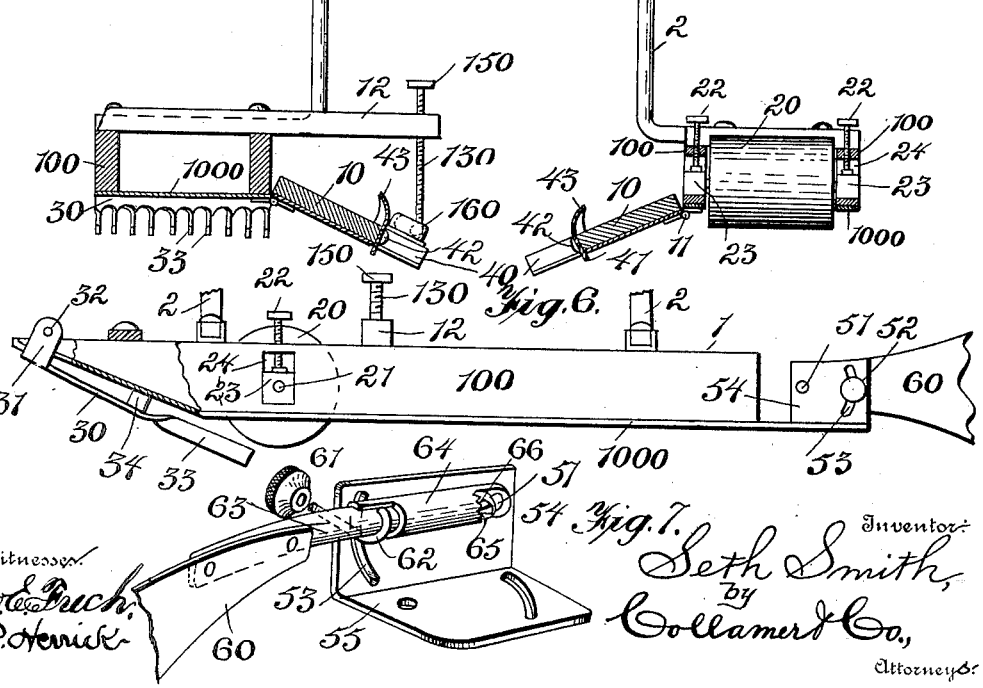
Fig. 6.
Fig. 7.
Witnesses: Inventor:
Seth Smith,
by
Collamer & Co.,
Attorneys

UNITED STATES PATENT OFFICE.

SETH SMITH, OF CASTANA, IOWA.

LISTED-CORN CULTIVATOR.

SPECIFICATION forming part of Letters Patent No. 657,840, dated September 11, 1900.

Application filed January 20, 1900. Serial No. 2,162. (No model.)

*To all whom it may concern:*

Be it known that I, SETH SMITH, a citizen of the United States, and a resident of Castana, Monona county, State of Iowa, have invented certain new and useful Improvements in Listed-Corn Cultivators; and my preferred manner of carrying out the invention is set forth in the following full, clear, and exact description, terminating with claims particularly specifying the novelty.

This invention relates to cultivators, more especially to that class which are adapted for use in connection with listed corn whose rows are planted in a valley or furrow having each side wall rising gradually to the ridge between one row and the next. Incidentally the machine may also be used as a harrow or a clod-crusher, or both, and it has mechanism for replanting missing hills.

The invention consists in the general construction and arrangement of parts hereinafter described, and illustrated in the drawings in two types, one a cheaper and simpler grade and the other a more expensive and effective form.

Figure 2:
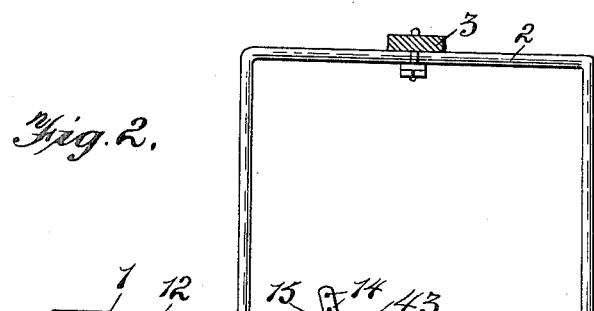
Figures 3, 8:
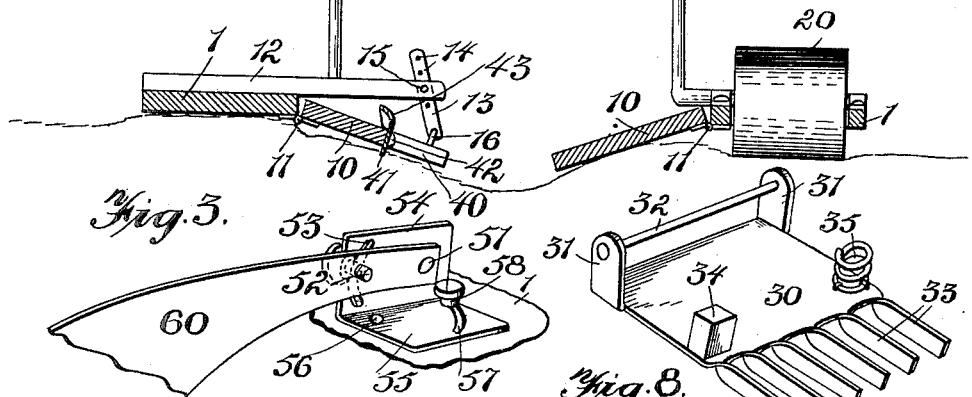

In the said drawings, Figure 1 is a plan view of the simpler type, showing the roller in position on the right runner and omitted from the left and illustrating the various blades in different positions. Fig. 2 is a cross-section on the line 2 2 of Fig. 1, taken through the roller in one runner and just in rear of the support for the other. Fig. 3 is a detail of one of the simpler forms of cultivator-blades and its holder. Fig. 4 is a plan view of the more expensive type of this machine, showing the roller in the right runner and also in the left and also showing the harrows attached to the left runner and omitted from the right. Fig. 5 is a cross-section on the line 5 5 of Fig. 4. Fig. 6 is a left side elevation of the type shown in Fig. 4, partly in section, to illustrate the support for the outer harrow. Fig. 7 is a perspective detail of my preferred form of cultivator-blade and its holder removed. Fig. 8 is a perspective detail of one of the harrows removed.

The framework of my improved cultivator consists of two parallel runners 1 1, connected by arches 2 2, whose tops carry the seat-beam 3, whereon is the driver's seat 4, handles 5 being sometimes provided, if desired, as well.

The draft mechanism by which the team is attached to this device is not herein illustrated, as it may be of any well-known type, and forms no part of the present invention. The runners, which are spaced so as to travel upon the ridges, consist of flat boards, to whose inner edges wings 10 are hinged, as at 11, and the angle of these wings may be adjusted by any suitable means. The inner edges of the wings and the rear inner corners of the runners stand at an angle to the outer edges of the runners, as shown in Fig. 4. In Fig. 2 a bar 12 projects inward over and beyond the runner and is slotted for the reception of the upper end of a link 13, provided with a series of holes 14, adjustably engaged by a pin 15 through the bar, while the lower end of the link is loosely connected, as at 16, with the wing. In Fig. 5 a screw 130 is threaded through a similar bar 12, has a handle 150 at its upper end, and has a ball 160 at its lower end loosely engaging a slot in socket-piece on the wing. The latter can be adjusted vertically by either construction or by any similar arrangement which will answer, and the entire machine is a clod-crusher, especially when used in connection with the devices next to be described.

20 are rollers mounted in openings through the runners near their forward ends and usually projecting slightly below their lower faces. The shafts 21 of these rollers are adjustable vertically in any suitable manner, (not well shown in the simpler type of my device, although to be there understood.) In the more expensive type the runner may consist of two side bars 100, sheathed on their lower faces with metal 1,000, (and the wings may also be similarly sheathed, if desired,) and the roller 20 is located in an opening in the sheathing of the runner, with its shaft passing through the side bars. A screw 22 may pass downward into each of these bars for adjusting vertically a block 23, located in an upright slot 24 in each side bar, and the shaft is journaled in this block. I do not limit myself to this means of adjusting the roller vertically, but give it merely as an illustration. When the roller is depressed, it is clear that the front end of the runner will be raised. The front ends of the runners are turned up in any event, so as to pass over rough ground and obstructions, and I provide harrows removably attached thereto, so as to be used when desired in connection with the wing as well as with the runner. One of these harrows is shown in detail in Fig. 8. It consists of a flat body 30, with upturned ears 31 at its front corners, connected by a cross-rod 32, adapted to extend over the front end of the wing or runner, and the rear end of the flat plate 30 is slitted into or may be provided with teeth 33, which are twisted so as to stand on edge, as indicated. This figure shows a block 34 secured upon one edge of the body 30 and a spring 35 secured upon its other edge, but they are equivalents of each other, and there are to be two of whichever are employed. These constitute stops to press the rear end of the body and all of the teeth downward, while the front end of the device is sustained by being hooked over the runner. The harrows may be used in connection with the rollers, if desired, and either, or both, may be removed when preferred. When the harrows are removed, the stops come away with them, which leaves the front end of the runners free from obstructions.

The inner edges of the wings and runners are provided with oblique notches, as seen at 40 in Fig. 1, and in the forwardmost of such notches are hoes 41, pivoted at 42 near their front ends, with their bodies standing oblique to the line of travel and converging toward each other and their upper edges bent over into footpieces 43. The driver, sitting on the seat 4, can press his feet upon either of these pieces 43 to throw the lower edge of its hoe into the earth, and thus in a measure guide the machine, or when a missing hill is reached he can drop a few kernels of corn in front of one or both of these hoes, and then by depressing them cover the kernels and plant a new hill.

Figs. 3 and 7 illustrate forms of cultivator-blades and their holders which are used in connection with this machine. In Fig. 1 oblique plates 50 are secured within the notches 40, and the blades 60 have their stems pivoted at 51 near the front corners of these plates and are provided with attaching means consisting of set-screws 52, with their shanks taking through curved slots 53 near the rear ends of these plates, whereby the set-screws may be loosened and the bodies of the blades raised or lowered. In Fig. 3 the same blade, with its pivot and set-screw, is used; but the slot is in a holder 54, which is of L shape, and its lower horizontal member 55 is pivoted at 56 upon the runner and has a curved slot 57 receiving the shank of another set-screw 58, which takes into the runner. By this arrangement the holder has an adjustment about a vertical pivot, which adjustment necessarily affects the angle that the cultivator-blade shall assume toward the line of travel, while the blade also has the same vertical adjustment as above described. In the very simplest form the blade has one adjustment only, and the plate or holder 50 stands oblique. In Fig. 7 is shown my preferred form of blade and its holder. The latter is again of L shape, permitting the same horizontal and vertical adjustment; but instead of the set-screw 52 I here employ an attachment consisting of a thumb-nut 61, engaging the shank of a bolt 62, passing through the slot 53 and curved around the stem 63 of the blade 60. This stem is cylindrical and is journaled in a bearing 64, whose forward end is pivoted at 51 to the upright member of the holder. The front end of the stem has a lug 65, adapted to engage any one of several notches 66 formed in the front end of the bearing 64. This construction of attachment permits the same adjustments as described for those above, and in addition it permits the operator by loosening the thumb-nut to push the stem forward, disengage this lug from one of the notches, rotate it on its axis, and set it into another notch, and then retighten the thumb-nut to hold the parts in position. With the exception of the very simplest form of holder all these above described are mounted upon the rear ends of the runners and the wings, if of wood, or upon the rear extremities of the sheathing 1,000, if that be employed.

All parts are of the desired sizes, shapes, proportions, and materials, though the runners and wings of the simpler type are preferably of wood, while in the more expensive type they are of wooden beams sheathed with metal. The side beams, handles, and wing-supporting bars may also be of wood, and all other parts are preferably of metal. The handles may be of any proper shape and size and might be omitted, if desired. The operator obviously sits upon the seat, and the operation of guiding the machine and planting missing hills is above described. To use the device as a harrow, four of the harrows shown in Fig. 8 are attached in the manner set forth, with or without the rollers, as preferred, and the cultivators may be set so as not to touch the earth or to assist the harrow-teeth with their work. To use the device as a clod-crusher, the wings are set flat or in line with the runners, and here again the harrows, rollers, and cultivator-blades may or may not be used, as preferred. The attaching of the team is a matter necessitating no particular description.

It is well known that in the cultivation of listed corn and especially where the hills are young and small the weeds grow mostly on the inclines. While those which grow on the tops of the ridges can be easily treated, it is extremely difficult to cultivate on the sides of the ridges and down into the valleys without either injuring the young plants or throwing too much of the loose soil around them. Again, repeated cultivation or frequent rains may destroy the general shape of the ridges and valleys whereby the angle of the wings must be changed. This is permitted by my device. Still further, when plants grow to considerable size they can be cultivated without such extreme delicacy being necessary. The detachability of the harrows and the detachability and adjustability of the rollers serve this purpose and adapt the machine to plants of all ages and to ridges and valleys of all shapes; but perhaps the most important feature of my invention is the general arrangement and the wide range of adjustment possessed by the cultivator-blades, especially when constructed in accordance with my preferred form. Their bodies are curved slightly by preference something like moldboards, and when they are given a vertical and a horizontal adjustment and perhaps an axial adjustment in addition it will be seen that their operative edges can be caused to stand at any desired angle to the line of movement and to the surface of the earth. I do not elaborate upon the process of cultivating listed corn, as that is well known, but it will be obvious that a machine constructed in the above manner will perform its functions so as to make the work pleasure instead of toil.

What is claimed as new is—

1. In a listed-corn cultivator, two parallel runners connected by arches, and a seat-beam on the latter combined with wings hinged to the inner edges of the runners, bars projecting inward from the latter over the wings, adjusting devices for the wings at the inner ends of the bars, and rollers removably and adjustably journaled in the runners near their forward ends, as and for the purpose set forth.

2. In a device of the character set forth, the combination with a pair of parallel runners connected by a framework, wings hinged to their inner edges, and means for adjusting the angles of the wings; of vertically-adjustable rollers mounted in openings near the front ends of the runners, and harrows removably attached to the forward ends of the runners and wings, substantially as and for the purpose described.

3. In a device of the character set forth, the combination with parallel runners having adjustable wings with oblique notches in their inner edges, and a framework supporting a driver's seat; of hoes pivoted near their front ends in said notches and having their upper edges turned over into footpieces, as and for the purposes set forth.

4. In a device of the character described, the combination with a runner having an upturned front end; of a harrow removably mounted thereon and comprising a flat body with ears at its front corners connected by a cross-rod, said body having teeth at its rear end which are twisted so as to stand on edge, and stops secured on the body near its rear end to hold it in a position oblique to the runner, substantially as described.

5. In a cultivator, the combination with a runner, and a plate carried thereby and having a curved slot; of a cultivator-blade whose stem is pivotally connected with the plate, and an attachment whose shank engages the stem and slot, as and for the purpose set forth.

6. In a cultivator, the combination with a runner, and a holder consisting of an L-shaped plate having a curved slot in each of its members; of a pivot between the lower member and the runner, a set-screw engaging the latter and the slot in this member, a blade pivotally connected with the upper member, and an attachment whose shank engages the stem of the blade and the slot in this member, substantially as described.

7. In a cultivator, the combination with a support, a cultivator-blade holder mounted thereon, and means for adjusting it horizontally; of the blade proper having a cylindrical stem, a bearing in which the stem is journaled, a bolt with one end of its shank curved around the stem and its other end passing through the holder, and a thumb-nut on the same, all as and for the purpose set forth.

8. In a cultivator, the combination with a support, and a cultivator-blade holder mounted thereon and having a curved slot in its upright member; of the blade proper having a cylindrical stem, a bearing in which the stem is journaled, said bearing being pivoted to said upright member of the holder, a bolt with one end of its shank curved around the stem and its other end passing through said slot in the holder, and a thumb-nut on the same, all substantially as described.

9. In a cultivator, the combination with a support having an upright member provided with a curved slot; of a tubular bearing pivoted at one end to said member, a cultivator-blade having a stem journaled in said bearing, a bolt passing through the slot and engaging the stem adjacent the movable end of the bearing, and means for tightening the bolt on the stem and the bearing against the holder, as and for the purpose set forth.

10. In a cultivator, the combination with a support, a holder thereon, a tubular bearing having notches in its front end, and adjustable connections between the bearing and holder; of the cultivator-blade having a stem journaled in said bearing, and a lug on the stem adapted to engage said notches, as and for the purpose set forth.

11. In a cultivator, the combination with a support, a holder thereon, a tubular bearing having notches in its front end, said front end being pivoted to the holder and the latter provided with a slot struck on a curve around the pivot; of a cultivator-blade having a stem journaled in the bearing and provided with a lug adapted to engage the notches thereof, and a bolt having its shank passing through said slot with one end engaging said stem and the other end having a nut, all as and for the purpose set forth.

12. In a cultivator, the combination with a support, an L-shaped holder having curved slots in each member, the lowermost being pivoted to the support, and a set-screw in the latter engaging the slot in this member; of a tubular bearing pivoted near its front end to the upright member and having notches in said front end, a cultivator-blade whose stem is journaled in the bearing and has a lug engaging said notches, and a bolt having its shank passing through the slot in this member with one end engaging said stem and the other end receiving a nut, all as and for the purpose set forth.

In testimony whereof I have hereunto subscribed my signature this 15th day of January, A. D. 1900.

SETH SMITH.

Witnesses:
S. S. SNYDER,
C. E. ERSKINE.